United States Patent
Miller

(10) Patent No.: US 7,793,141 B1
(45) Date of Patent: Sep. 7, 2010

(54) ECOMMERCE OUTAGE CUSTOMER NOTIFICATION

(75) Inventor: Eric W. Miller, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 363 days.

(21) Appl. No.: 12/121,335

(22) Filed: May 15, 2008

(51) Int. Cl.
*G06F 11/00* (2006.01)

(52) U.S. Cl. ............................................. 714/4; 714/57
(58) Field of Classification Search .................... 714/4, 714/57
See application file for complete search history.

(56) References Cited

U.S. PATENT DOCUMENTS

| | | | |
|---|---|---|---|
| 5,875,291 A * | 2/1999 | Fox | 714/15 |
| 6,314,512 B1 * | 11/2001 | Branson et al. | 712/224 |
| 7,263,632 B2 * | 8/2007 | Ritz et al. | 714/25 |
| 7,548,980 B2 * | 6/2009 | Jones et al. | 709/227 |
| 7,552,365 B1 * | 6/2009 | Marsh et al. | 714/47 |
| 7,623,848 B2 * | 11/2009 | Rosenfelt et al. | 455/412.1 |
| 2001/0034627 A1 * | 10/2001 | Curtis et al. | 705/7 |
| 2002/0073364 A1 * | 6/2002 | Katagiri et al. | 714/48 |
| 2003/0083786 A1 * | 5/2003 | Pietrowicz et al. | 700/286 |
| 2003/0219029 A1 * | 11/2003 | Pickett | 370/442 |
| 2004/0205006 A1 * | 10/2004 | Kanai | 705/26 |
| 2005/0055285 A1 * | 3/2005 | Myrick et al. | 705/28 |
| 2006/0055549 A1 * | 3/2006 | Fischer et al. | 340/635 |
| 2007/0005536 A1 * | 1/2007 | Caswell et al. | 706/20 |
| 2008/0215919 A1 * | 9/2008 | Shaw | 714/25 |

* cited by examiner

*Primary Examiner*—Bryce P Bonzo
(74) *Attorney, Agent, or Firm*—Banner & Witcoff, Ltd.; Michael Springs

(57) ABSTRACT

Techniques for notifying customers when an outage of an eCommerce system has been resolved are disclosed. An e-commerce on-line platform detects the functional outage of a transaction entity when customers are trying to access an associated service from the transaction entity. Consequently, customers are routed to an outage web page, where customers are requested to provide contact information. When the functional outage is resolved, customers are notified using the contact information. Contact information may be the e-mail address or the phone number of the customer. A contact list is formed and a batch of notification requests is sent by an eCommerce on-line platform through an alerting vendor for notifying customers when a functional outage has been resolved. Notification requests may be partitioned into a plurality of batches so that customers are alerted in waves for controlling traffic on the associated transaction entity.

24 Claims, 8 Drawing Sheets

ECOMMERCE OUTAGE CUSTOMER NOTIFICATION

FIELD

Aspects of the invention generally relate to notifying customers when an outage of an eCommerce system has been resolved.

BACKGROUND

Electronic commerce, commonly known as e-commerce or eCommerce, consists of the buying and selling of products or services over electronic systems such as the Internet and other computer networks. The amount of trade conducted electronically has grown extraordinarily since the advent of the Internet. A wide variety of commerce is conducted in this way, spurring and drawing on innovations in electronic funds transfer, supply chain management, Internet marketing, online transaction processing, electronic data interchange (EDI), inventory management systems, and automated data collection systems. Modern electronic commerce typically uses the World Wide Web at least at some point in the transaction's lifecycle, although it can encompass a wider range of technologies such as e-mail as well. A large percentage of electronic commerce is conducted entirely electronically for virtual items such as access to premium content or services on a website, but electronic commerce may involve the transportation of physical items in some way. Online retailers are sometimes known as e-tailers and online retail is sometimes known as e-tail. Almost all big retailers have electronic commerce presence on the World Wide Web.

Consequently, eCommerce is becoming ubiquitous to many people in everyday life, spanning financial, telecommunications, information technology, and retail activities. Customers are becoming increasingly dependent on eCommerce web sites to shop, bank, pay bills, and so forth rather than traveling to a brick-and-mortar location or calling by telephone. However, when an eCommerce website experiences an outage, a web page is typically displayed to the customer stating that the function is currently unavailable. The customer is typically directed to try again later or call customer service. Such an approach is not desirable to the customer and may result in the customer using a different business that provides a more satisfying eCommerce experience.

BRIEF SUMMARY

An aspect of the invention addresses one or more of the issues mentioned above by disclosing methods, computer readable media, and apparatuses for notifying customers when an outage of an eCommerce system has been resolved.

According to another aspect of the invention, an e-commerce on-line platform detects a functional outage of a transaction entity when a customer is trying to access an associated service from the transaction entity. When this occurs, the customer is routed to an outage web page, and the customer is requested to provide contact information. When the functional outage is resolved so that the customer can access the desired service, the customer is notified using the contact information. Contact information may be the e-mail address or the phone number of the customer.

According to another aspect of the invention, a contact list is formed and a batch of notification requests is sent by an eCommerce on-line platform through an alerting vendor for notifying customers when a functional outage has been resolved. Notification requests may be partitioned into a plurality of batches so that customers are alerted in waves for controlling traffic on the associated transaction entity.

Aspects of the invention may be provided in a computer-readable medium having computer-executable instructions to perform one or more of the process steps described herein.

These and other aspects of the invention are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the invention, methods, computer-readable media, and apparatuses are disclosed in which an eCommerce on-line platform notifies customers when an outage of the eCommerce system has been resolved. When an outage occurs, the customer can register for a notification when a specific online servicing function is brought back on line. The notification may be sent to a variety of communication devices via e-mail, text messaging, and/or audio notification.

Prior art typically encounters several issues:

The Customer is asked to keep trying to gain access to a function which is down. This is typically a source of frustration to the customer. In addition, it adds additional load to a degraded or failed system, often times compounding the problem.

The additional volume into the call center can create long wait times, further degrading the customer experience.

According to an aspect of the invention, an end customer is notified when the transaction system is up and running. Reduction in call volume and enhanced customer satisfaction often results.

Figure 1:
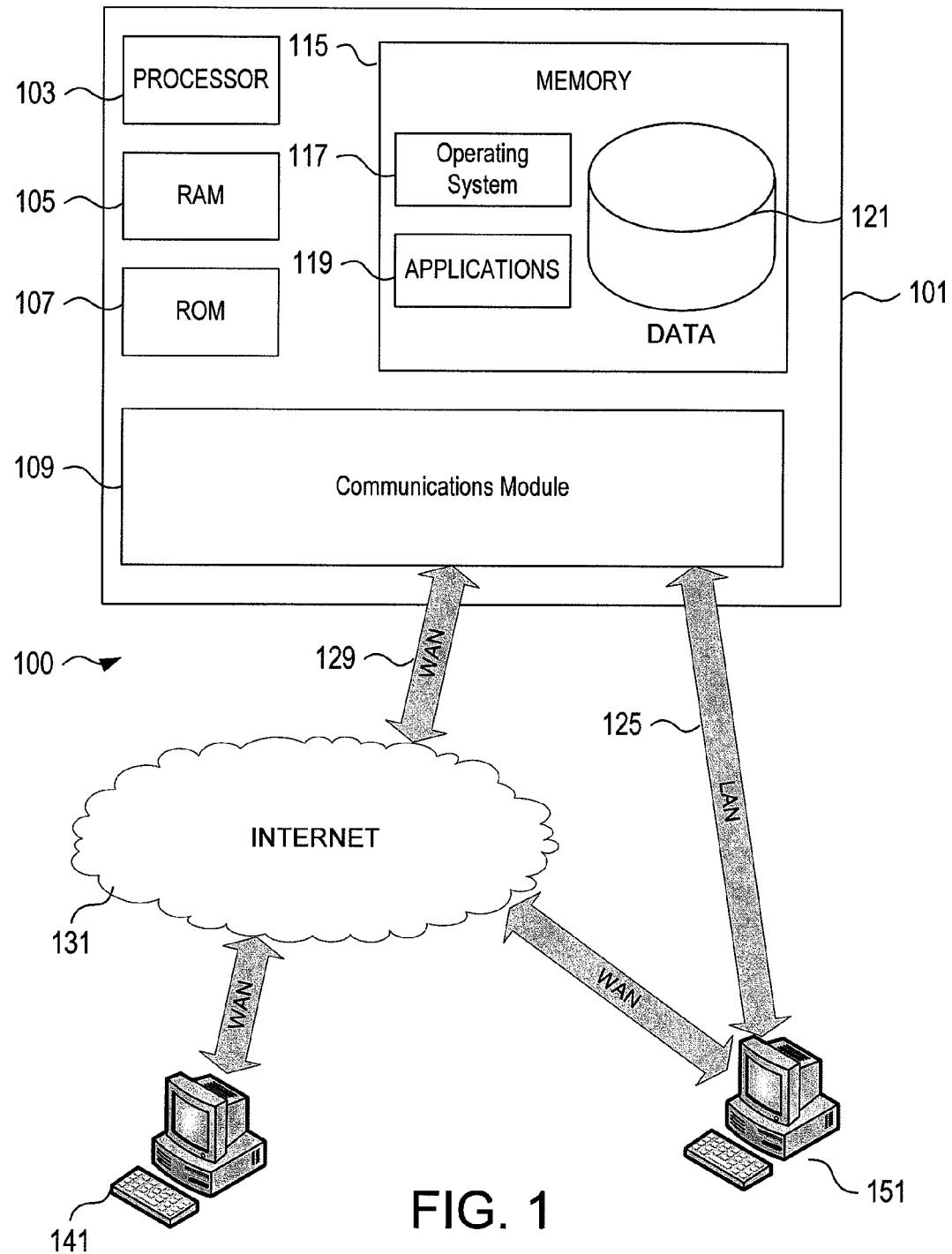
FIG. 1 shows an illustrative operating environment in which various aspects of the invention may be implemented.
Figure 3:
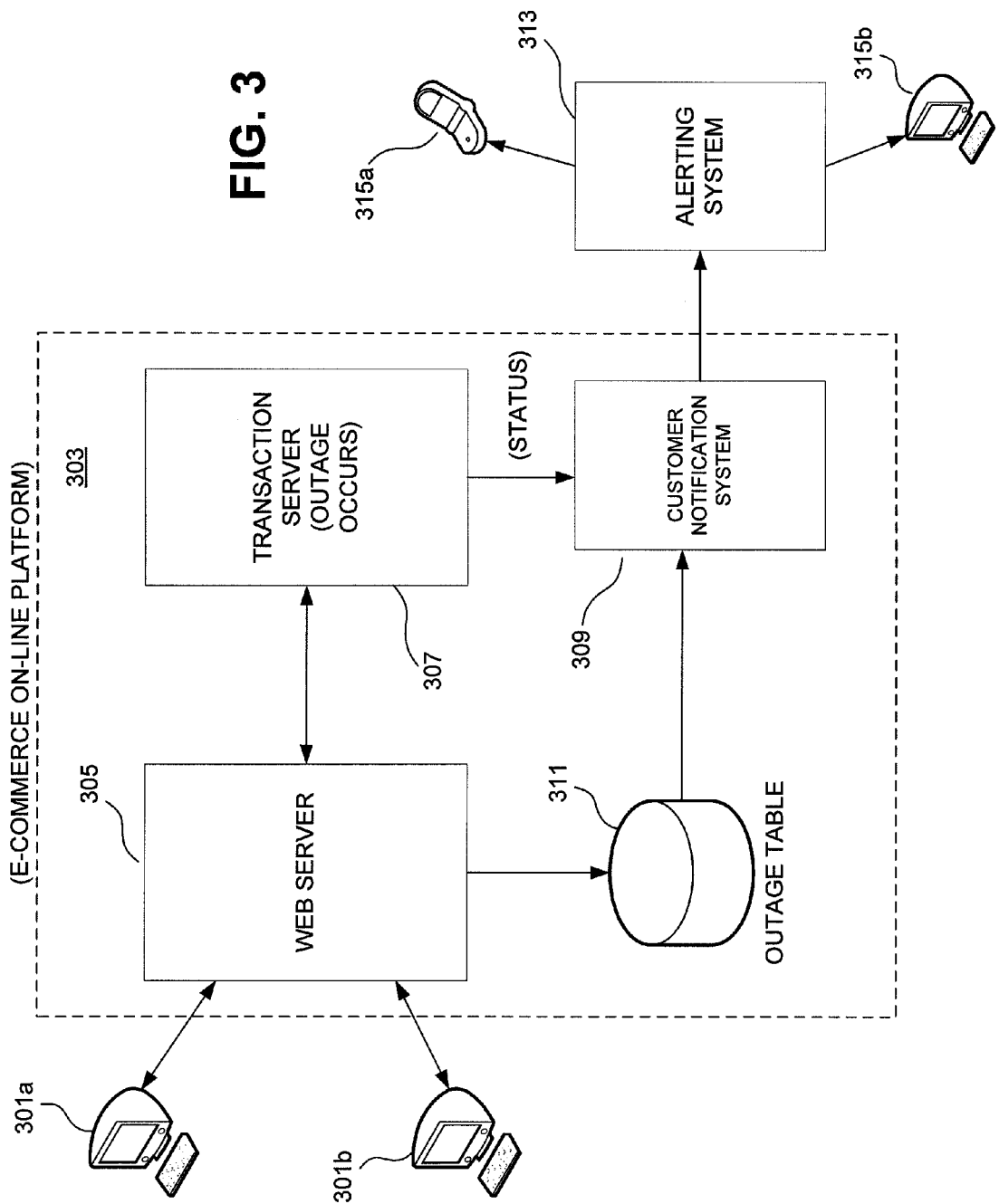
FIG. 3 shows an e-commerce on-line platform in accordance with one or more embodiments of the invention.
Figure 5:
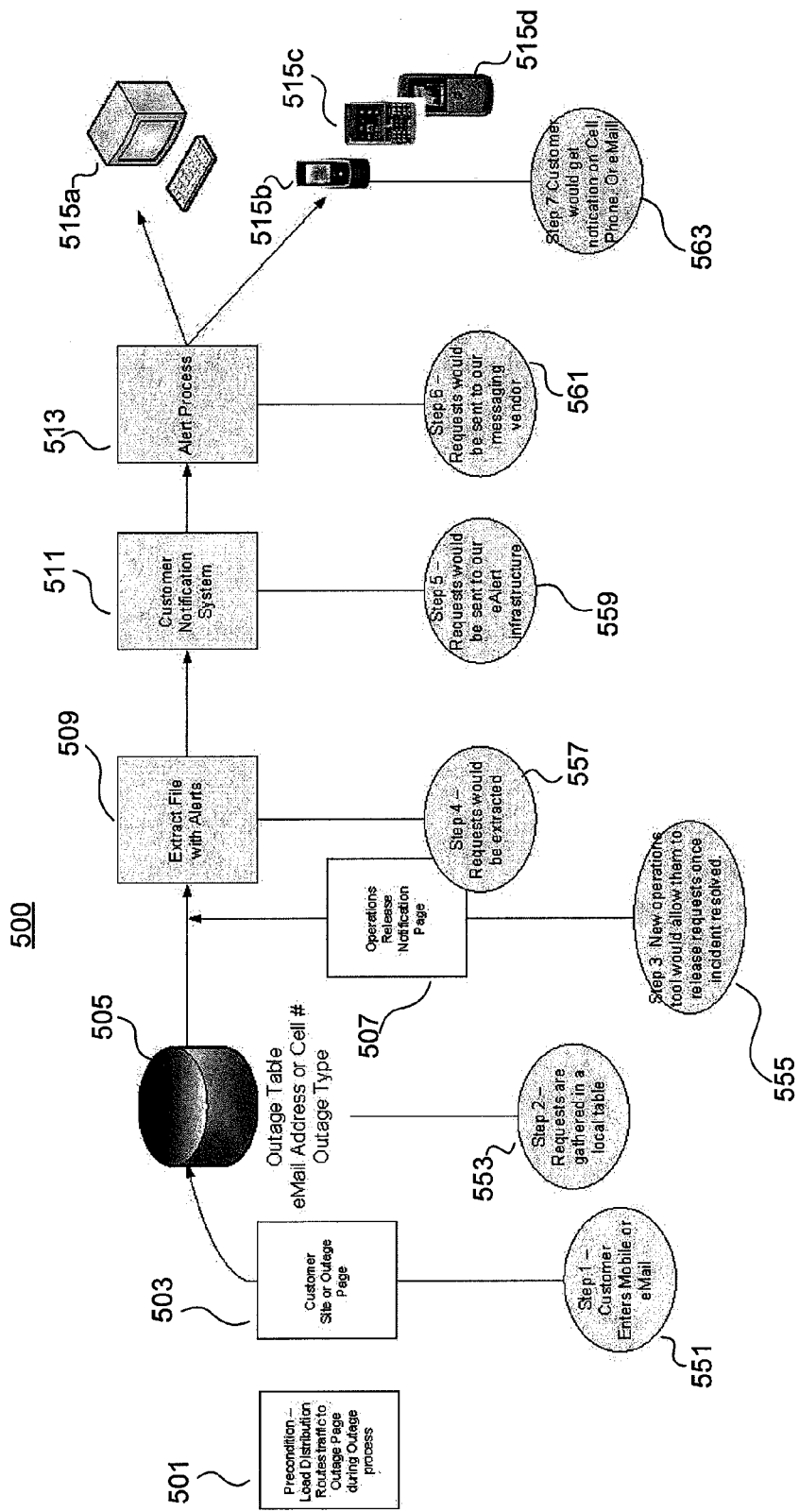
FIG. 5 shows a system providing a notification when an outage has been resolved in accordance with an embodiment of the invention.
Figure 6:
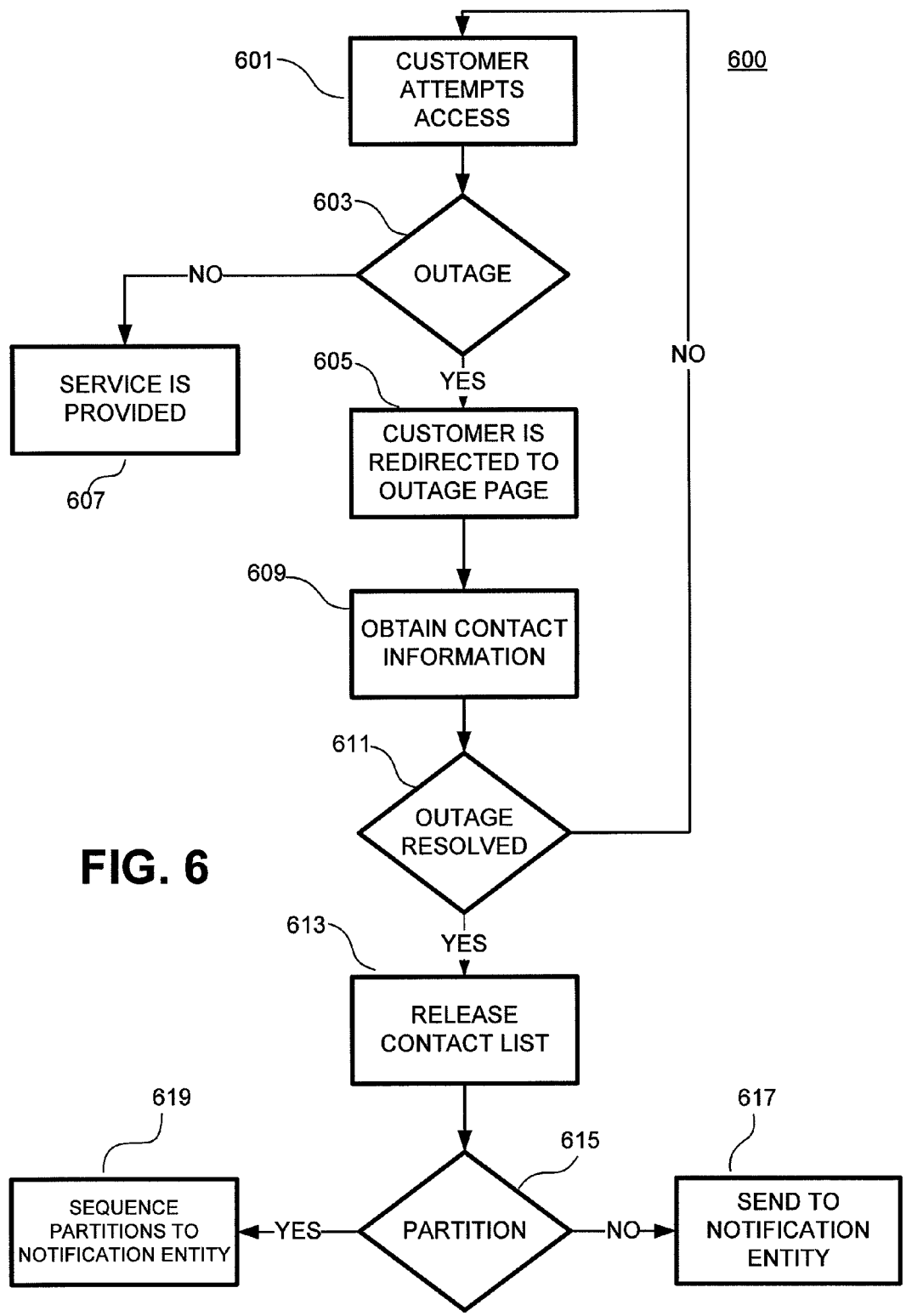
FIG. 6 shows a flow diagram in accordance with an embodiment of the invention.
Figure 7:
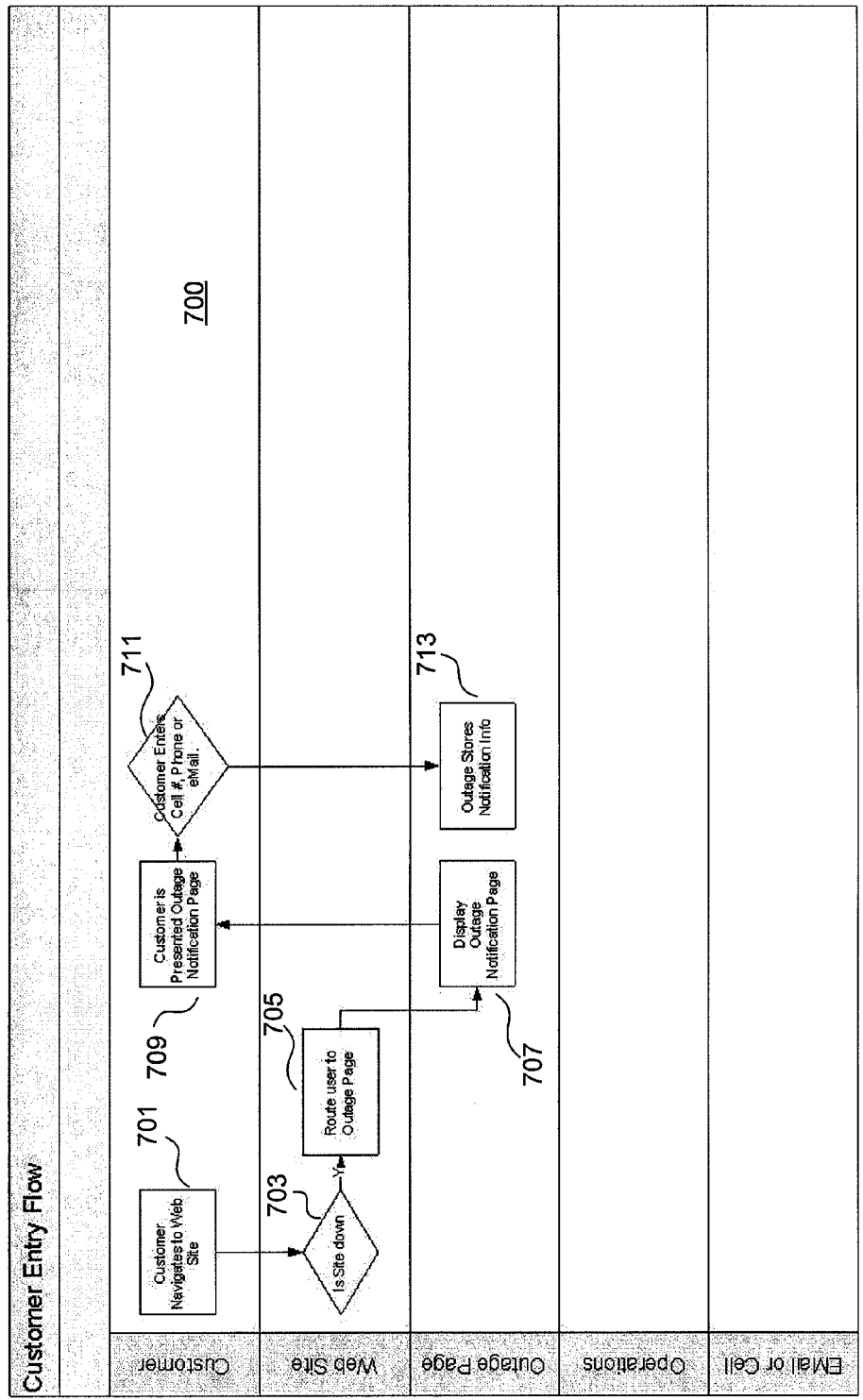
FIG. 7 shows a customer entry flow in accordance with an embodiment of the invention.
Figure 8:
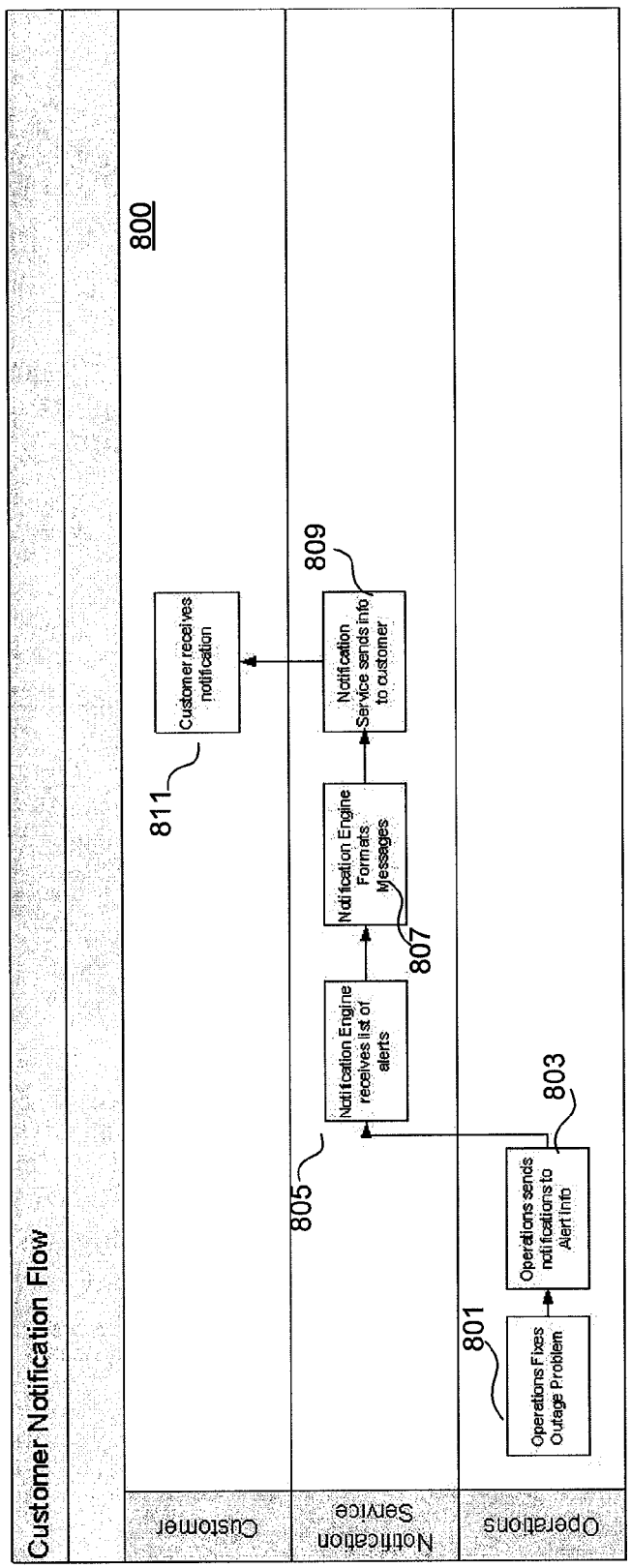
FIG. 8 shows a customer notification flow in accordance with an embodiment of the invention.

FIG. 1 illustrates an example of a suitable computing system environment 100 (e.g., on-line platform 303 as shown in FIG. 3, system 500 as shown in FIG. 5, process 600 as shown in FIG. 6, customer flow 700 as shown in FIG. 7, and customer notification flow 800 as shown in FIG. 8) that may be used according to one or more illustrative embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of components shown in the illustrative computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise and combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). Database 121 may provide centralized storage of pre-clearance information or trading information for security equities in different jurisdictions.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101.

The network connections depicted in FIG. 1 include a local area network (LAN) 125 and a wide area network (WAN) 129, but may also include other networks. When used in a LAN networking environment, computing device 101 is connected to the LAN 825 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, one or more application programs 119 used by the computing device 101, according to an illustrative embodiment of the invention, may include computer executable instructions for invoking user functionality related to communication including, for example, email, short message service (SMS), and voice input and speech recognition applications.

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

Figure 2:
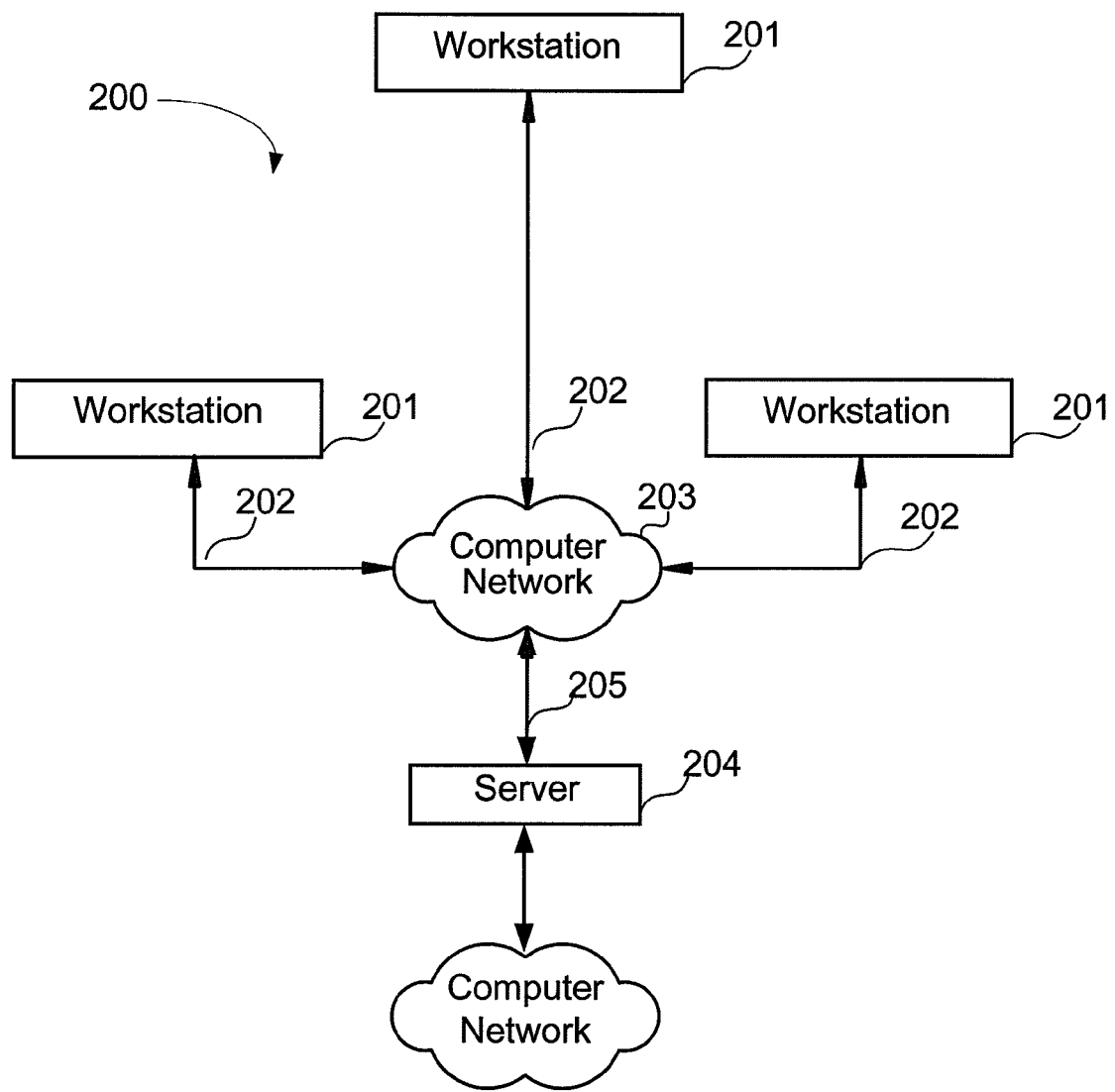
FIG. 2 is an illustrative block diagram of workstations and servers that may be used to implement the processes and functions of certain embodiments of the present invention.

Referring to FIG. 2, an illustrative system 200 for implementing methods according to the present invention is shown. As illustrated, system 200 may include one or more workstations 201. Workstations 201 may be local or remote, and are connected by one or communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

As understood by those skilled in the art, the steps that follow in the Figures may be implemented by one or more of the components in FIGS. 1 and 2 and/or other components, including other computing devices.

FIG. 3 shows e-commerce on-line platform 303 in accordance with an embodiment of the invention. On-line platform 303 typically provides services from a business for customers 301a and 301b. For example, Bank XYZ may allow customers 301a and 301b to verify checking balances, pay bills, and view credit card charges via the Internet. On-line platform 303 comprises web server 305, transaction server 307, outage table 311, and customer notification system 309. Customers 301a and 301b utilize services of a business through web server 305. Different services may be supported by different transaction servers (not shown).

In the discussion herein, an outage refers to a functional outage of a transaction entity that provides a desired service and not the "crashing" of the associated website.

If server 307 experiences an outage, then the associated service is not available to customers 301a and 301b. In such a case, a traffic manager (not shown) redirects customers 301a and 301b to outage page 400 (FIG. 4) as discussed herein. After customers 301a and 301b have been redirected to outage page, contact information is collected from customers 301a and 301b, which is entered into a memory device associated with outage table 311.

When the outage of transaction server 307 has been resolved, contact information from outage table 311 is provided to customer notification system 309, which formats the contact information into a suitable message for wireless phone 315a or computer 315b through alerting system 313. For example, alerting system 313 may send a short text message via a short message service (SMS) to wireless phone 315a and an e-mail message to computer 315b.

Embodiments of the invention may support other types of communication devices, including BlackBerry® e-mail devices and portable media players. Also, while FIG. 2 shows two customers 301a and 301b utilizing on-line platform 301 and communication devices 315a and 315b receiving a notification, on-line platform 303 may provide services and notification messages for a varying number of customers that may vary from one to many thousands or millions of customers, depending on the amount of traffic and the capacity of the transaction server 307.

Figure 4:
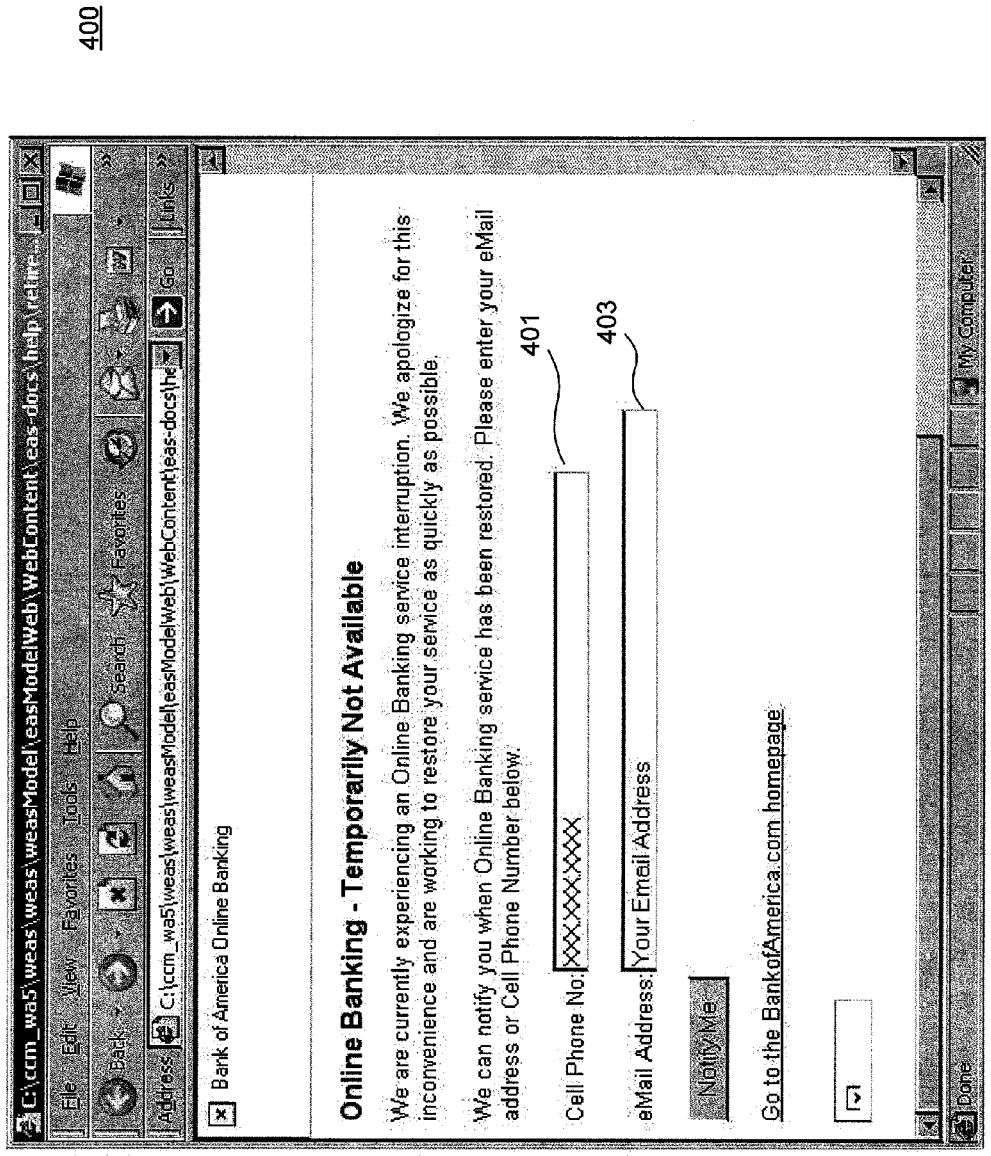
FIG. 4 shows an outage page in accordance with an embodiment of the invention.

FIG. 4 shows outage page 400 in accordance with an embodiment of the invention. Customer 301a or 301b may enter contact information, e.g., cell phone number 401 and e-mail address 403. A customer may chose to enter contact information in a plurality of input fields if the customer wishes to be contacted through a plurality of communication devices. Outage page 400 typically does not request sensitive account information of the customer in order to provide privacy and security for the customer.

On-line platform 303 may also determine if customer 301a or 301b is a valid customer in order to prevent malicious attacks on on-line platform 307. For example, if the IP address is the same as the IP address of previously registered customers, platform 303 may deduce that the customer is invalid. In such a case, platform 303 may ignore the detected invalid customer or may display a notice to that effect on outage page 400.

FIG. 5 shows system 500 providing a notification to communication devices 515a-515d when an outage of transaction server 307 has been resolved. With an aspect of the invention, system 500 leverages a business's existing eAlerts infrastructure to allow customer 301a or 301b to register for a notification when transaction server 307 is back up.

When an outage of transaction server 307 is detected, system 500 executes precondition process 501 when on-line platform 303 detects an outage of transaction server 307. All traffic accessing the website associated with the service is routed to customer outage notification page 400. Typical web load balancing architecture includes a traffic manager, e.g., F5 BIG-IP® Global Traffic Manager™, which is capable of rerouting traffic to alternate sites. When users try to access a data center that is overloaded or unreachable, the traffic manager may automatically and seamlessly direct customers 301a and 301b to a secondary data center.

In step 551, customer 301a or 301b lands on page 503 (e.g., outage page 400) which states the occurrence a functional outage ("Online Banking—Temporarily Not Available page"). Customer 310a or 301 provides contact information, e.g., e-mail address, phone or Cell Phone number and selects "Notify Me" and presses submit.

In step 553, outage page 503 accepts the request from customer 301a or 301b, and consequently the cell phone, phone, or email address is uploaded to outage table 505 in a data structure, e.g., database. No sensitive information is typically accepted from customer 301a or 301b. Subsequently, customer 301a or 301b leaves the site and waits for notification based on cell phone identification, e-mail address, outage type, and date/time.

In step 555, the operations organization fixes the outage. Once service is restored, the operations organization releases the notification requests via a new screen in process 507. It is possible for operations to release the notification in waves of alerts, to even the demand on the system 500 in order to ameliorate traffic volume on transaction server 307 when service resumes.

In step 557, each released batch creates a set of records that is sent to notification engine 511 from process 509. Typically, a batch comprises a subset of customers that have provided contact information. The size of a batch may be determined by the traffic capacity of transaction server 307.

As an example for determining the size of a batch (waves or partitions), assume that transaction server 307 can support x transactions per second and that a batch (partition) is released at a predetermined time duration (T) after releasing the previous batch. (The predetermined time duration unit can typically vary from seconds to minutes based on the granularity of traffic control that is desired.) If a batch is released (sequenced) every predetermined time duration, each batch is partitioned into T/x notification requests.

In step 559, the business's customer notification engine 511 creates a formatted alert for each type of outage (corresponding to a service), indicating to customer 301a or 301b (corresponding to communication devices 515a-515d) that the service has been restored and that it is permissible for that customer to attempt to try that function. The formatted message may differ based on whether request is cell phone, telephone, or e-mail and the Outage Type.

In step 561, notifications requests are sent to an alert process 513. The alert process can be internal or external to a business's system. For example, alerting vendors such as Verisign, Par3, or Varolli transmit notification messages to communication devices 515a515d by notification system 511 sending a request with associated contact information and formatting information to the alerting vendor.

FIG. 6 shows flow diagram 600 in accordance with an embodiment of the invention. In step 601, a customer attempts to access a service provided by transaction server 307 through web server 305. It the requested service is available, the customer utilizes the service in step 607. If the requested service is not available because an outage occurs at transaction server 307 (as determined by step 603), the customer is redirected to outage page 400 in step 605.

In step 609, outage page 400 collects contact information from the customer and enters the information into outage table 311. When the outage has been resolved in step 611, the outage list is released in step 613. The outage list may be released in partitions (step 615) and sent to notification system 309 in step 619. Otherwise, the complete outage list is sent to notification system 309 in step 617.

FIG. 7 shows customer entry flow 700 in accordance with an embodiment of the invention. In step 701, the customer navigates to web site 305 to utilize a desired service. If step 703 determines that the service is not available (step 703), the customer is routed to the outage notification page in step 705.

The outage page is displayed and presented to the customer in step 707 and step 709 so that the customer can enter contact information in step 711. Contact information is stored in outage table 311 in step 713.

FIG. 8 shows customer notification flow 800 in accordance with an embodiment of the invention. In step 801, the outage of transaction server 307 is resolved and contact information from outage table 505 is extracted in step 803. Notification engine 511 obtains the list of alerts in step 805 and formats the alerts into alerting messages based on the outage type in step 807. In step 809, notification service 511 sends notification messages to alerting vendor 313, and the customer is alerted in step 811.

On-line platform 303 may be used for different online servicing environments where outage notification may be beneficial to the customer. Illustrative eCommerce applications include the following sectors: financial, telecommunications, information technology (IT), and retail.

Aspects of the invention have been described in terms of illustrative embodiments thereof. Numerous other embodiments of the invention, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A computer-assisted method comprising:
    (a) detecting a functional outage of a transaction entity;
    (b) receiving, through a first web page, a request from each of a plurality of customers for a service provided by the transaction entity;
    (c) routing a connection from each of the plurality of customers to a second web page;
    (d) obtaining contact information for each of the plurality of customers through the second web page;
    (e) detecting a resolution of the functional outage; and
    (f) from the contact information, notifying each of the plurality of customers that the service is available.

2. The method of claim 1, wherein the contact information for at least one of the plurality of customers includes an e-mail address of a corresponding customer.

3. The method of claim 1, wherein the contact information for at least one of the plurality of customers includes a telephone identification of a corresponding customer.

4. The method of claim 1, further comprising:
    (g) forming a contact list for the plurality of customers from the contact information.

5. The method of claim 4, further comprising:
    (h) providing a batch of notification requests to an alerting entity from the contact list, each notification request including corresponding contact information for a corresponding customer.

6. The method of claim 5, further comprising:
    (i) partitioning the contact list into a plurality of batches; and
    (j) releasing the plurality of batches as a sequence of batches.

7. The method of claim 6, wherein (j) comprises:
    releasing each batch based on an estimated demand on the transaction entity and a transaction capability of the transaction entity.

8. The method of claim 5, wherein the functional outage is associated with one of a plurality of outage types.

9. The method of claim 8, further comprising:
    (g) formatting a notification request based on said one of the plurality of outage types.

10. The method of claim 5, further comprising:
    (g) formatting the notification request based on a wireless service type.

11. The method of claim 1, wherein (e) comprises:
    receiving an operations notification indication; and
    extracting a notification request.

12. The method of claim 1, further comprising:
    (g) determining whether said one of the plurality of customers is an invalid customer.

13. The method of claim 6, further comprising:
    (j) balancing a traffic load on the transaction entity by sequencing the plurality of batches.

14. A computer-readable storage medium storing computer-executable instructions that, when executed, cause a processor to perform a method comprising:
    (a) detecting a functional outage of a transaction entity;
    (b) receiving, through a first web page, a request from each of a plurality of customers for a service provided by the transaction entity;
    (c) routing a connection from each of the plurality of customers to a second web page;
    (d) obtaining contact information for each of the plurality of customers through the second web page;
    (e) detecting a resolution of the functional outage; and
    (f) from the contact information, notifying each of the plurality of customers that the service is available.

15. The computer-readable medium of claim 14, further comprising:
    (g) forming a contact list for the plurality of customers from the contact information.

16. The computer-readable medium of claim 15, further comprising:

(h) providing a batch of notification requests to an alerting entity from the contact list, each notification request including corresponding contact information for a corresponding customer.

17. The computer-readable medium of claim 16, further comprising:
   (i) partitioning the contact list into a plurality of batches; and
   (j) releasing the plurality of batches as a sequence of batches.

18. The computer-readable medium of claim 17, further comprising:
   (k) releasing each batch based on an estimated demand on the transaction entity and a transaction capability of the transaction entity.

19. An apparatus comprising:
   a memory; and
   a processor coupled to the memory and configured to perform:
   (a) detecting a functional outage of a transaction entity;
   (b) receiving, through a first web page, a request from each of a plurality of customers for a service provided by the transaction entity;
   (c) routing a connection from each of the plurality of customers to a second web page;
   (d) obtaining contact information for each of the plurality of customers through the second web page;
   (e) detecting a resolution of the functional outage; and
   (f) from the contact information, notifying each of the plurality of customers that the service is available.

20. The apparatus of claim 19, further comprising:
   an alerting system configured to send a notification message to the plurality of customers based on the contact information.

21. The apparatus of claim 19, wherein the processor is further configured to perform:
   (g) forming a contact list for the plurality of customers from the contact information.

22. The apparatus of claim 21, wherein the processor is further configured to perform:
   (h) providing a batch of notification requests to a notification entity from the contact list, each notification request including corresponding contact information for a corresponding customer.

23. The apparatus of claim 22, wherein the processor is further configured to perform:
   (i) partitioning the contact list into a plurality of batches; and
   (j) releasing the plurality of batches as a sequence of batches.

24. The apparatus of claim 23, wherein the processor is further configured to perform:
   (k) releasing each batch based on an estimated demand on the transaction entity and a transaction capability of the transaction entity.

\* \* \* \* \*